United States Patent Office.

IMPROVEMENT IN THE MANUFACTURE OF PARIS WHITE AND WHITING.

WILLIAM W. CHIPMAN, OF NEW YORK, N. Y., ASSIGNOR TO THE CHIPMAN MINING COMPANY, OF SAME PLACE.

Letters Patent No. 60,142, dated December 4, 1866; antedated November 22, 1866.

SPECIFICATION.

TO ALL WHOM IT MAY CONCERN:

Be it known that I, WILLIAM W. CHIPMAN, of the city and county of New York, in the State of New York, have invented certain new and useful improvements in the Manufacture of Paris White and Whiting; and I do hereby declare that the following is a full and exact description thereof.

My invention produces a superior article of Paris white or whiting, producing the one or the other, according to the fineness with which it is ground, and at a less cost than these articles have been ordinarily produced. I manufacture them from the earth known as marl. I have employed with success a great number of samples from different beds of marl from the cretaceous formation, and believe that all the material in that formation known as shell-marl can be employed with about equal results.

I will describe the means which I have employed in operating this invention with success, it being of course understood that in operating on a large scale various modifications of the apparatus and of the several details of the processes may be made by any good mechanic.

The marl, after being dug and dried, (the drying is not deemed essential,) is calcined by exposure in a furnace, kiln, or crucible to a heat required to bring the marl to a cherry-red color. After calcination under these conditions, the marl is removed and allowed to cool. It is now of a clear white color. It is next ground fine and exposed to the air at ordinary temperatures in a thin stratum for a period varying from a few hours to as many days or weeks, until it becomes neutral. I test the sufficiency of the exposure to the fire by examining when the whole has become whitened, and I test the sufficiency of the exposure to the atmosphere by observing when the marl loses its caustic properties and becomes neutral, which may be ascertained by tasting or by acids. The neutralizing of the marl is probably due simply to the absorption of carbonic acid from the atmosphere. In a low, damp situation, where carbonic acid abounds, the neutralization of my samples was effected in a few hours. In air ordinarily pure and dry, some of the marl has retained its caustic taste after an exposure of a week or more. When the whole is neutralized, I wash it with water, allowing it to flow into a tank and be deposited at different distances therein, according to its fineness, the fine flowing the furthest, as is practised in the manufacture of white lead. When settled to the bottom, and the water removed, the material is removed and dried in the air at the ordinary temperatures, or by any of the well-known artificial methods. It is then fit for use. I believe that the period required for the neutralization may be very greatly shortened by the artificial production of carbonic acid by the combustion of charcoal, or other ordinary means, and exposing the marl thereto on a series of platforms, or by other convenient means. I propose to sift, or otherwise distribute, the marl in its finely divided state through an atmosphere thus artificially charged with carbonic acid as a means of facilitating the neutralization whenever great haste is required. I believe it will usually, however, be found the cheapest to allow time for the acid to be absorbed from the common atmosphere. The order of burning, grinding, exposing, and washing may be changed, but I prefer the order described.

Having now fully described my invention, what I claim as new, and desire to secure by Letters Patent, is as follows:

The manufacture, as herein described, of Paris white and whiting from the earthy material known as marl.

W. W. CHIPMAN.

Witnesses:
   THOMAS D. STETSON,
   D. L. FREEBORN.